United States Patent [19]

Olson

[11] 3,917,902

[45] Nov. 4, 1975

[54] TELEVISION RECEIVER WITH PATTERN GENERATOR

[75] Inventor: John Emery Olson, Harbert, Mich.

[73] Assignee: Heath Company, Benton Harbor, Mich.

[22] Filed: July 17, 1974

[21] Appl. No.: 489,198

[52] U.S. Cl. ................. 178/6; 178/68; 178/DIG. 4; 358/10

[51] Int. Cl.$^2$ ........................................ H04M 5/24

[58] Field of Search .................... 178/6, 6.8, DIG. 4; 358/10

[56] References Cited

UNITED STATES PATENTS

| | | | |
|---|---|---|---|
| 3,404,222 | 10/1968 | Rupley | 358/10 |
| 3,592,544 | 6/1971 | Wlasuk | 178/6.8 |

*Primary Examiner*—Benedict V. Safourek
*Assistant Examiner*—Edward L. Coles
*Attorney, Agent, or Firm*—William R. Sherman; John D. Crane

[57] ABSTRACT

A pattern generator for a color television receiver which utilizes a digital counter to count scanning lines and produce an output pulse every ninth and tenth scan. An oscillator coupled to the horizontal deflection voltage produces pulses at a repetition rate which is substantially higher than the scan frequency. The high frequency pulses from the oscillator are then combined with the output of the counter to produce either a crosshatch or a dot pattern on the screen. The crosshatch pattern is developed when both the oscillator and counter outputs are continually fed to the television video circuit, and the dot pattern is produced by coupling a signal to the video circuit only upon the simultaneous occurrence of both the oscillator and the counter pulse outputs.

14 Claims, 5 Drawing Figures

TELEVISION RECEIVER WITH PATTERN GENERATOR

BACKGROUND OF THE INVENTION

The present invention relates to the use of a pattern generator for a color television receiver. A built-in pattern generator is known in U.S. Pat. No. 3,404,222, however, the present invention utilizes a digital circuit to produce an improved pattern on the picture tube. The improved pattern is produced by a counter which counts scan lines and produces output pulses at repetitive intervals and an oscillator which produces output pulses at a frequency higher than the scan frequency. Through this technique an improved crosshatch or dot pattern can be produced.

SUMMARY OF THE INVENTION

It is an important feature of the present invention to provide an improved pattern generator for a color television receiver.

It is another object of the present invention to provide a pattern generator for a color television receiver using digital control circuitry.

It is an important object of the present invention to provide a pattern generator as described above wherein a digital counter is used to count scan lines for the purpose of contributing to the desired test pattern.

It is a further object of the present invention to produce a pair of signals for developing horizontal and vertical parallel lines on the picture tube and to gate these signals either continually to produce a crosshatch pattern or only during the simultaneous occurrence of the two signals to produce a dot pattern.

It is also an object of the present invention to use a digital counter as described above in a pattern generator wherein the counter is synchronized by the vertical deflection voltage of the television receiver.

These and other objects, features and advantages of the present invention will be understood in greater detail from the following description and the associated drawings wherein reference numerals are utilized to designate a preferred embodiment.

DESCRIPTION OF THE PREFERRED EMBODIMENT

The present invention relates to a color television receiver having a pattern generator for producing a plurality of test patterns on the picture tube for the purpose of adjustment of convergence, pincushioning, and sweep circuit linearity.

In order to properly adjust the convergence, pincushioning and sweep linearity of a color television receiver, it is necessary to use a signal generator that will display a uniform pattern on the screen. For the linearity adjustments, it is required that all pattern elements that are related to the horizontal sweep be spaced equally across the screen and that all pattern elements that are related to the vertical sweep be spaced equally across the screen from top to bottom. For pincushioning adjustments, a pattern of a plurality of intersecting horizontal and vertical lines, known as a crosshatch pattern, is most useful. For convergence adjustments, a uniform pattern of "dots" or a "crosshatch" works very well. A pattern whose elements are quite small in size and of high definition simplify the adjustments because the areas of misconvergence are easily detected.

Although pincushioning and sweep linearity are not likely to need readjustment once properly set, convergence is likely to need adjustment and most certainly will if the color TV receiver is moved from its original location. This is due mainly to the effect on the electron beams of the picture tube by the earth's magnetic field. The average set owner is not likely to have access to a pattern generator or even know how to perform the adjustments. In this case, a service technician must be hired or else let the set go without the necessary adjustment.

In a somewhat different situation, however, is the owner-builder of the "kit TV." In this case, he constructs the receiver from a set of parts and performs all adjustments except certain critical adjustments which must be preset by the manufacturer.

U.S. Pat. No. 3,404,222 describes a dot generator. The pattern generator of the present invention is superior to the dot generator described in U.S. Pat. No. 3,404,222. In the present invention, (1) the dot images produced are small and of high definition; (2) the images produced are of constant intensity across the screen; (3) the size and shape of the dot images are constant across the screen; (4) the image produced is stable, i.e., it does not roll or jitter; (5) signal voltages are at low levels, minimizing radiation into other receiver circuits.

Figure 1:
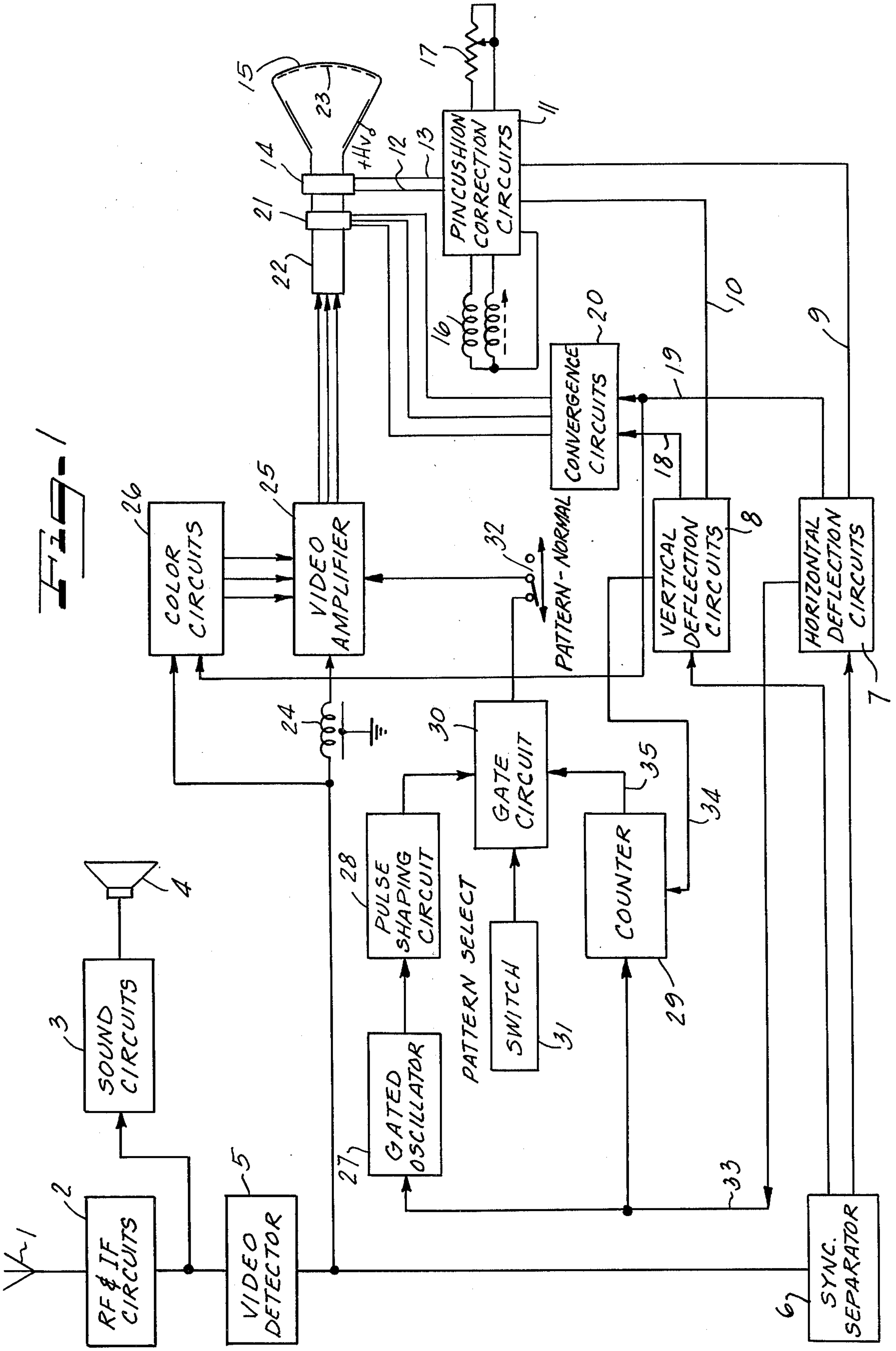
FIG. 1 is a block diagram of a color television receiver having a pattern generator according to the present invention.

FIG. 1 is a block diagram representing a color television receiver with a pattern generator. The signal is received by antenna 1 and fed to the RF and IF circuitry 2 where the signal frequency is selected, converted to an intermediate frequency and amplified. A portion of the output of 2 is fed to the sound circuitry 3 where it is demodulated and amplified and the sound then reproduced by loudspeaker 4. The rest of the output signal from 2 is fed to the video detector 5 where the signal is demodulated. The output of video detector 5 is a composite video signal. A portion of the composite video signal is fed to the sync separator 6 where the sync pulses are stripped from the composite video signal, amplified and then fed to the horizontal deflection circuits 7 and the vertical deflection circuits 8. The sync pulses are used to synchronize the generation of deflection currents, which are fed out on lines 9 and 10 to the pincushion correction circuitry 11, with the beam deflection waveform of the camera that produced the video signal. The pincushion correction circuitry 11 modulates the horizontal and vertical deflection currents in a manner so as to produce deflection currents on lines 12 and 13 which, when coupled to deflection yoke 14, will compensate for the natural pincushioning of the raster on the screen 15 of the picture tube. The amount of correction added to the deflection currents is varied by phase coil 16 and amplitude control 17.

Voltages from both the horizontal and vertical deflection circuits are coupled on lines 18 and 19 to the convergence circuitry 20. By careful adjustment of the controls in the convergence circuitry, the currents fed to the convergence pole pieces 21 will cause the three electron beams in the picture tube 22 to be in alignment passing through the holes in the shadow mask 23 as the beams are deflected vertically and horizontally across the face of the screen.

The composite video signal from video detector 5 is also coupled to delay line 24 where it is delayed before being coupled to the video amplifier 25. A portion of the composite video signal is also coupled, along with a horizontal gating pulse from line 19, to the color circuitry 26 where the reference carrier is regenerated and the chroma signal amplified and demodulated. The Red or R-Y, Blue or B-Y and Green or G-Y, three color signals, are then coupled to the video amplifier to be combined with the luminance or Y signal before being fed to their respective cathodes of the picture tube.

The pattern generator consists of a gated oscillator 27, a pulse shaping circuit 28, a counter 29 with a plurality of stages, a gate circuit 30, a switch 31 to select the type of pattern, and a switch 32 to select either "pattern" or "normal" operation.

A horizontal gating pulse coincident with horizontal retrace is coupled on line 33 to the gated oscillator 27 and to the clock input of counter 29. A vertical gating pulse coincident with vertical retrace is coupled on line 34 to the reset input of counter 29. The counter consists of a plurality of stages and produces an output pulse on line 35 every time a certain number of input pulses have been received. The horizontal gating pulses coupled to the gated oscillator 27 turn said oscillator off during horizontal retrace time. At the end of horizontal retrace, the pulse is removed thus enabling the oscillator and synchronizing its output to the beginning of each horizontal scan line. The oscillator 27 operates at a multiple frequency of the horizontal scan frequency. The oscillator output signal is coupled to pulse shaping circuit 28 which differentiates the signal into pulses coinciding with the positive going and negative going transitions of oscillator voltage. These pulses are coupled to gate circuit 30 which is responsive also to the output pulses from counter 29. Gate circuit 30 functions either as an "AND" gate or an "OR" gate as selected by pattern select switch 31. The output of gate 30 is coupled to switch 32 which, when in "Pattern" position, applies the pattern signal to the video amplifier circuits.

Figure 2:
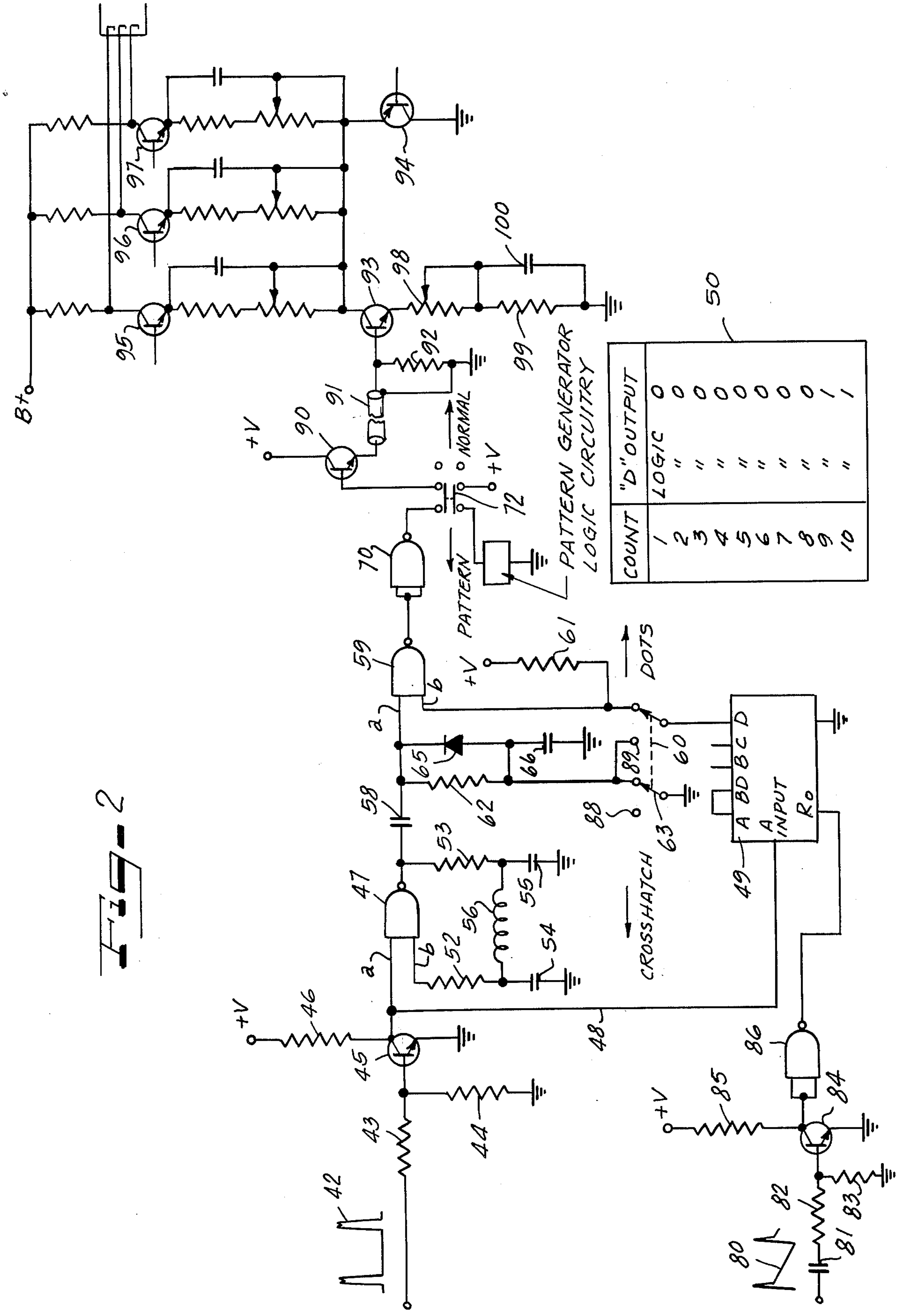
FIG. 2 is a detailed schematic of a pattern generator circuit also for use in a television receiver of the type shown in FIG. 1.

FIG. 2 shows the details of the pattern generator circuit. In FIG. 2, a horizontal deflection voltage 42 is coupled to a voltage divider network consisting of resistors 43 and 44, the junction of which is coupled to the base of a transistor 45. Transistor 45 is turned "ON" by the positive going horizontal retrace pulse of the waveform 42. Current then flows through the resistor 46, placing the collector of transistor 45 at logic "0" during the horizontal retrace pulse. This logic "0" coupled to input "*a*" of NAND gate 47 disables the gate. This pulse is also coupled by way of circuit line 48 to the "A" input of a decade counter 49. The counter is advanced by the logic "1" to the logic "0" transition and therefore will advance one count at the beginning of each horizontal retrace pulse. In this way, the counter 49 is effectively counting horizontal scan lines.

The "A" output of the counter 49 is connected to "BD" input. Thus the counter will divide by 10. This means that the "D" output will produce a logic "1" pulse for every 10 pulses at the "A" input. A truth table 50 is shown in FIG. 2. The truth table indicates that "D" goes high after count 8 and remains high for two counts. This means that the "D" output produces a positive pulse for every ninth and tenth scan lines. At the end of each ten scan lines the counter resets to logic "0" and the process is repeated.

Figure 4:
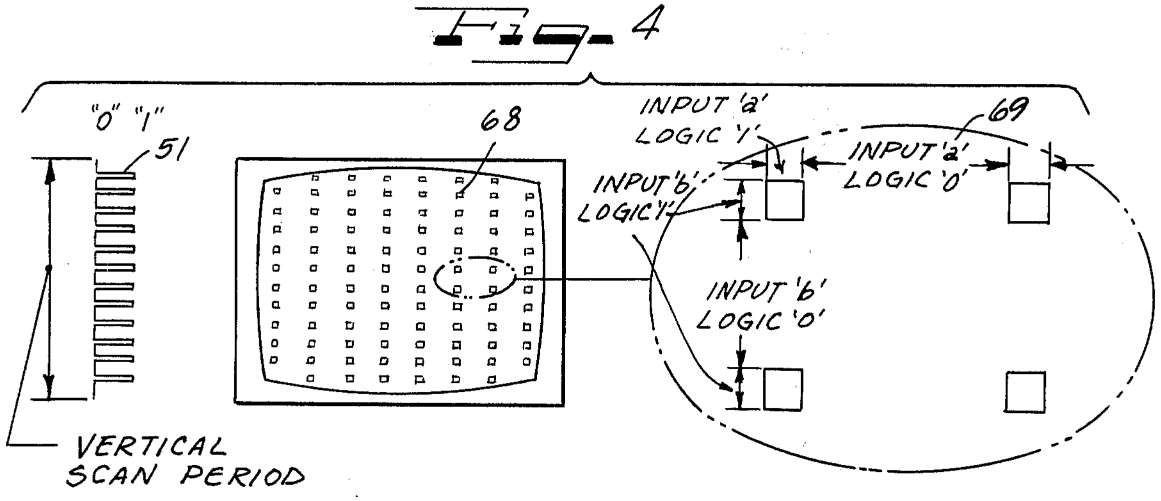
FIG. 4 is a diagram illustrating the effect on the picture tube of different logic states of the gates shown in FIG. 2 to produce a dot pattern on the picture tube.
Figure 5:
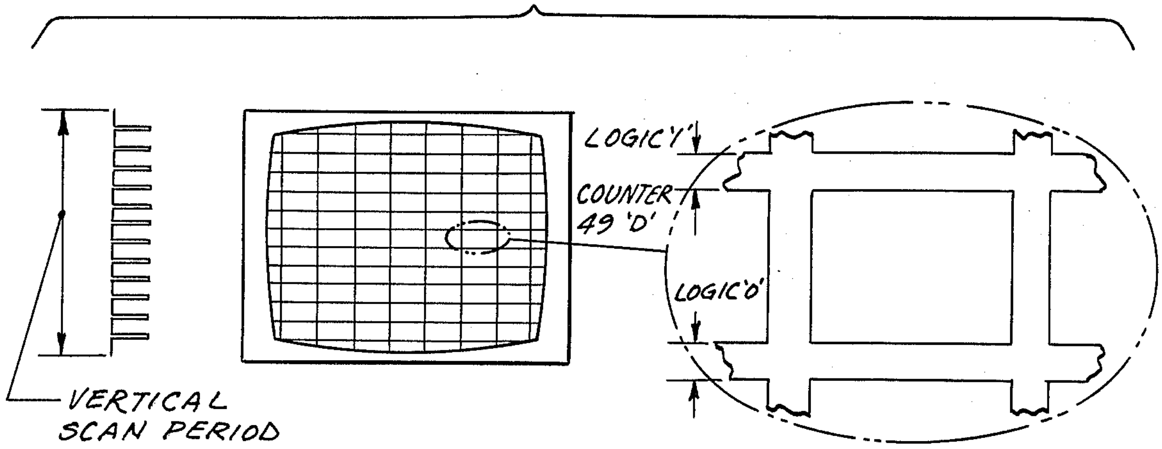
FIG. 5 is a diagram similar to FIG. 4 pertaining, however, to a crosshatch rather than a dot test pattern.

FIG. 4, a representative train of pulses from the "D" output of counter 49, is identified by numeral 51.

Figure 3:
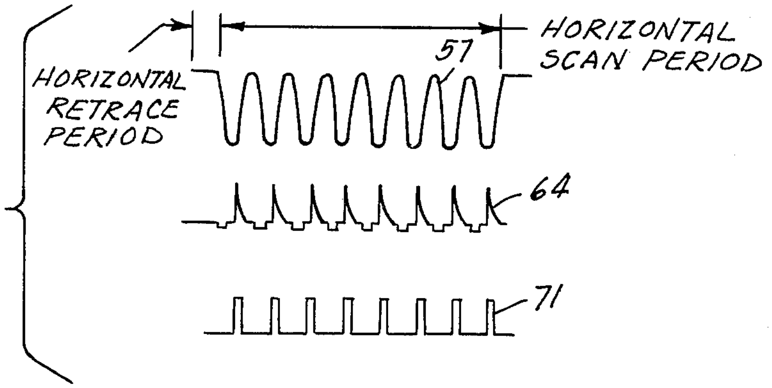
FIG. 3 is an illustration of wave forms developed in the pattern-generator circuit of FIG. 2.

With the input "*a*" of gate 47 held at logic "1" for the time interval between horizontal retrace pulses by the extra transistor 45, gate 47 provides simple inversion from input "*b*" to the output. An oscillator is provided by resistors 52 and 53, capacitors 54 and 55, and coil 56. The coil and the capacitors determine the frequency of oscillation. Resistors provide isolation between input and output of gate 47. The waveform at the output of gate 47 approximates a sine wave as shown in FIG. 3 and identified by reference numeral 57.

The output of gate 47 goes to logic "1" during each horizontal retrace pulse as its input "*a*" is made logic "0" by the action of transistor 45. At the end of each horizontal retrace pulse, when the oscillator as described is gated "ON," its output voltage starts from a logic "1" each time and is therefore synchronized with the beginning of each horizontal scan line. Synchronism is of course important to be sure that the vertical test pattern lines will in fact be vertical and straight. The output of the gate 47 is coupled to a capacitor 58 to input "*a*" of another gate 59.

A switch 60 is provided to change the operation of gate 59 in such a way as to either produce a dot pattern or a crosshatch matrix on the picture tube. The dot pattern is produced by operating the switch 60 in the position illustrated in FIG. 2. It is noted that a positive power supply is coupled to a resitor 61 to the switch as shown.

In the position shown in FIG. 2 the "D" output of the decade counter 49 is coupled to the "b" input of the gate 59. At the same time, a resistor 62 which is coupled from the "*a*" input of the gate 59 is grounded through the switch contact 63. This places the input "*a*" of gate 59 at logic "0." The time constant of the capacitor 58 and the resistor 62 is short compared to the frequency of the output of the gate 47. The output of the gate 47, as shown at 57 in FIG. 3, is thus differentiated into positive and negative going pulses, basically as shown at 64 in FIG. 3. The negative going pulses at input "*a*" of gate 59 are clamped to ground by the action of a diode 65. When switch 60 is in its other position, the negative going pulses are coupled as shown through a capacitor 66 to ground.

The positive going pulses as shown at 64 in FIG. 3 increase the voltage at the input "*a*" of gate 59 sufficiently to make it a logic "1," causing the gate to "NAND" if, and only if, the gate has been enabled by a logic "1" at the input "*b*." This occurs every ninth and tenth horizontal scan line by virtue of the above explanation of the pulse developed at the output "D" of the decade counter 49. In this way a video signal is produced at the output of the gate 59 only every ninth and tenth scan line and only at points corresponding to the pulses 64 in FIG. 3. This produces a resulting dot pattern shown in FIG. 4 and indicated by reference numeral 68.

An illustration of the logic required to produce the dot pattern 68 is shown to the right of the dot pattern 68 in an enlarged view 69.

The output of the gate 59 is inverted by a further gate 70 and also the pulses are squared as shown in FIG. 3 and indicated by reference numeral 71. This output is then coupled through the "pattern-normal" switch 72 as shown in FIG. 2 to the video circuit. When the switch 72 is in the position shown, the video pattern signal is coupled to the television video circuit to be added to the normal video signal. When switch 72 is in the normal position, the video pattern signal is disconnected from the video circuit, and supply voltage is removed from the pattern generator logic circuitry.

Referring back to the counter 49, it is necessary to synchronize the counter with the vertical deflection voltage. The vertical deflection voltage is shown in FIG. 2 by reference numeral 80 and is coupled through a capacitor 81 to a voltage divider network consisting of resistors 82 and 83. The junctions of the resistors are coupled to the base of a transistor 84. Because of the time constant of the capacitor 81 and resistor 82, the transistor 84 is responsive only to the high frequency component of the waveform 80 which occurs during the vertical retrace time. Transistor 84, therefore, is turned on during vertical retrace time causing current to flow through resistor 85, making the collector of transistor 84 become a logic "0." The logic "0" is coupled to the input of "NAND" gate 86 which inverts it to a logic "1" and couples it to the reset input of counter 49 as shown. The counter is reset to all logic "0" output by the logic "1" reset pulse and is inhibited from counting until the logic "1" is removed. In this way the counter 49 is synchronized to the vertical sweep signal.

As explained above, when the switch 60 is in the dot position, as shown in FIG. 2, an output is provided by the gate 59 only upon the simultaneous occurrence of an output of the oscillator signal appearing at the cathode of the diode 65 and an output of the "D" terminal of the counter 49. However, to produce a crosshatch pattern, the switch 60 is moved to the crosshatch position 88 and 89 in FIG. 2. When this is done, the "*b*" input of the gate 59 is held at a logic "1" and thereby enabling the gate 59. The output of the counter 49 is then coupled through the resistor 62 to the input "*a*" of the gate 59. This is the same input which receives the output of the oscillator. Accordingly, a pattern video signal will be produced at the output of gate 59 whenever either a positive pulse appears at the "D" output of the counter, or a positive pulse appears at the oscillator output. This means that every ninth and tenth line will be illuminated, and also vertical lines will be illuminated on the picture tube at the frequency provided by the oscillator and consisting of the elements 52, 53, 54, 55 and 56. Essentially then the gate 59 which previously functioned as a "NAND" gate, in the crosshatch position, is converted to a "NOR" gate.

Transistor 90 is operating as an emitter follower driving a coax cable 91 terminated in its characteristic impedance by resistor 92 and the input impedance of transistor 93. Transistor 94 is the luminance driver stage of the TV receiver. Luminance or "Y" signal is coupled to the base of transistor 94 from the previous luminance stage. Transistor 94 is operating as an emitter follower, driving the emitters of the Red, Blue and Green video output amplifiers 95, 96, and 97. Transistor 93 parallels transistor 94 and also functions as a driver for the Red, Blue and Green video output amplifiers. The amplified video signal at the collectors of the video amplifiers is applied directly to the cathodes of the picture tube. The brightness of the video scene is adjustable by the "user" brightness control on the front panel. This control varies the average DC level of the "Y" signal at the base of transistor 94. This varies the conduction of the Red, Blue and Green video amplifier stages, thus also varying the average DC level at the collectors and the picture tube cathodes. The "pattern" brightness is independently adjustable by potentiometer 98 which varies the amount of current flowing in transistor 93 and hence the conduction of the Red, Blue and Green video amplifiers during the time that transistor 93 is turned "ON" by the positive going pulses from gate 70. Resistor 99 limits the maximum amount of current in transistor 93 while capacitor 100 provides some high frequency compensation of the pattern signal. Thus, in the manner just described, the pattern can be added to the program video material on the screen.

I claim as my invention:

1. In a television receiver having a normal video circuit and an associated picture tube, a pattern generator for being coupled thereto comprising:

means for developing a first signal in synchronism with the electron beam scan of the picture tube for producing a generally parallel line display in a first direction, means for developing a second signal in synchronism with the electron beam scan of the picture tube for producing a generally parallel line display in a second perpendicular direction, gating means having a first function of continually coupling a pattern signal to the video circuit during the occurrence of either of said first and second signals, means for switching the function of said gating means to couple a pattern signal to the video circuit only during the simultaneous occurrence of both said first and second signals, and manual means for adding the pattern display to normal video display.

2. A pattern generator in accordance with claim 1 wherein said gating means comprises a "NAND" gate and wherein said means for switching the function of said gating means comprises means for converting said "NAND" gate to a "NOR" gate.

3. A pattern generator in accordance with claim 1 wherein said first and second signals are coupled to different inputs of said gating means, said gating producing an output pattern signal where said first and second signals appear simultaneously at said different inputs.

4. A pattern generator in accordance with claim 1 wherein said means for developing said first signal comprises an oscillator and means for pulsing said oscillator with pulses from the horizontal deflection circuit of the television receiver.

5. A pattern generator in accordance with claim 4 wherein said means for developing said first signal includes means to clip the negative portions of the oscillations developed from said oscillator.

6. A pattern generator in accordance with claim 1 wherein said means for developing said second signal comprises a digital counter, means for coupling pulses to the counter from the horizontal deflection circuit of the television receiver, and said counter developing said second signal at the output thereof following a predetermined count of said horizontal pulses.

7. In a color television receiver having a normal video circuit and an associated picture tube together with horizontal and vertical scanning means, a built-in pattern generator comprising:

means for producing a first video signal which is repetitive at a frequency substantially higher than the scan frequency and which is in synchronism therewith, a digital counter for counting horizontal scan lines and for producing a second video signal at least for the duration of a single scan following repetitive fixed counts, means for gating the first and second video signal to the picture tube to produce a matrix test pattern, and means to synchronize said counter with the vertical scan signal.

8. A pattern generator in accordance with claim 7 wherein the vertical deflection voltage of the color television receiver is used to reset the counter to zero during vertical retrace.

9. A pattern generator in accordance with claim 7 wherein said first and second signals are coupled to different terminals of said gating means when a dot pattern is desired and to the same terminal when a crosshatch pattern is desired and wherein means are provided to continually enable the other one of said terminals to produce said crosshatch condition.

10. In a television receiver having a normal video circuit and an associated picture tube, a pattern generator for being coupled thereto comprising:

means for developing a first signal in synchronism with the electron beam scan of the picture tube for producing a generally parallel line display in a first direction, means for developing a second signal in synchronism with the electron beam scan of the picture tube for producing a generally parallel line display in a second perpendicular direction, gating means having a first function of continually coupling a pattern signal to the video circuit during the occurrence of either of said first and second signals, means for switching the function of said gating means to couple a pattern signal to the video circuit only during the simultaneous occurrence of both said first and second signals, and manual means for adding the pattern display to normal video display.

11. A pattern generator in accordance with claim 10 wherein said means for developing said first signal comprises an oscillator and means for pulsing said oscillator with pulses from the horizontal deflection circuit of the television receiver.

12. A pattern generator in accordance with claim 10 wherein said means for developing said second signal comprises a digital counter, means for coupling pulses to the counter from the horizontal deflection circuit of the television receiver, and said counter developing said second signal at the output thereof following a predetermined count of said horizontal pulses.

13. A pattern generator in accordance with claim 10 wherein said first and second signals are coupled to different inputs of said gating means, said gating producing an output pattern signal where said first and second signals appear simultaneously at said different inputs.

14. A pattern generator in accordance with claim 13 wherein said means for switching the function of said gating means comprises means for switching both said first and second signals from said different inputs to the same input of said gating means and for continually applying an enabling signal to the other input thereof.

* * * * *